United States Patent [19]

Seidel

[11] Patent Number: 4,979,493
[45] Date of Patent: Dec. 25, 1990

[54] SOLAR HEATER SYSTEM

[75] Inventor: Pessach Seidel, Jerusalem, Israel

[73] Assignee: Oran Heating Equipment Limited, Jerusalem, Israel

[21] Appl. No.: 378,167

[22] Filed: Jul. 11, 1989

[30] Foreign Application Priority Data

Jul. 15, 1988 [IL] Israel ........................ 87117

[51] Int. Cl.$^5$ .............................................. F24J 2/44
[52] U.S. Cl. ..................... 126/434; 126/437
[58] Field of Search ............... 126/434, 435, 437, 433, 126/418, 419, 420; 237/1 R, 56, 59; 165/60, 106

[56] References Cited

U.S. PATENT DOCUMENTS

| 4,003,367 | 1/1977 | Wilkholm | 126/434 |
| 4,519,383 | 5/1985 | Larkin | 126/434 |
| 4,567,878 | 2/1986 | Larkin | 126/437 |
| 4,685,445 | 8/1987 | Seidel | 126/437 |

Primary Examiner—James C. Yeung
Attorney, Agent, or Firm—McAulay Fisher Nissen and Goldberg

[57] ABSTRACT

A solar fluid heater consisting of a solar collector and a storage vessel. The solar collector includes a supply outlet and a return inlet, a supply conduit, leading the heated fluid from the supply outlet to the vessel, and a return conduit, returning the cold fluid from the vessel to the return inlet. The supply conduit comprises two contiguous portions, a first portion substantially exposed to the same night temperature as in the collector, and extending between the supply outlet and a transition zone. The first supply conduit portion takes an altogether descending course from the supply outlet to at least the transition zone, and a second portion is adapted to maintain it at night at a temperature substantially equaling that of the vessel contents and extends from the transition zone to the outlet opening of the supply conduit inside the vessel, whereby, during the night, the temperature of the first return-conduit portion is substantially equal to the temperature of the vessel contents.

19 Claims, 7 Drawing Sheets

SOLAR HEATER SYSTEM

The present invention relates to a thermosyphonic solar heater.

Although in recent years the overall efficiency of such solar heaters has greatly improved, mainly due to better craftsmanship, more judicious choice of structural and insulation materials, selective coatings, etc., a main problem a truly satisfactory solution to which has not yet been found, is reverse circulation, a term referring to the fact that, in the absence of sunshine, and particularly during the night when the water in the collector cools down and becomes colder than the water in the tank or vessel, the thermosyphonic action will change direction and hot water accumulated in the vessel will start to flow into the collector which now acts as cooler. As a consequence, the user is liable to find himself in the mornings without, or with little, hot water.

It is one of the objects of the present invention to overcome the deficiencies of prior art solar heaters and to provide a solar water heater that, while compatible with all conventional vessel-collector configurations, permits full control of reverse circulation, from practically zero to a controllable, slight amount desirable, e.g., in cold climates, to prevent freezing over the collector during nights.

This the invention achieves by providing a solar fluid heater comprising a solar collector and a storage vessel, said solar collector having a supply outlet and a return inlet; a supply conduit, leading the heated fluid from said supply outlet to said vessel; a return conduit, returning the cold fluid from said vessel to said return inlet, wherein said supply conduit comprises two contiguous portions, a first portion substantially exposed to the same night temperature as is said collector, and extending between said supply outlet and a transition zone, said first supply conduit portion taking an altogether descending course from said supply outlet to at least said transition zone, and a second portion having means to maintain it at night at a temperature substantially equaling that of the vessel contents and extending from said transition zone to the outlet opening of said supply conduit inside said vessel, and wherein said return conduit comprises two contiguous portions, a first portion the inlet opening of which is located in said vessel, which first portion is in at least indirect thermal contact with the contents of said vessel, whereby, during the night, the temperature of said first return-conduit portion is substantially equal to the temperature of said vessel contents, which first portion continues from said location in said vessel at least to the level of said transition zone of said supply conduit, from which level a second portion of said return conduit continues towards said return inlet, said second portion being substantially exposed to the same night temperature as is said collector.

The invention further provides a solar fluid heater comprising a solar collector and a storage vessel, said solar collector having a supply outlet and a return inlet; a supply conduit, leading the heated fluid from said supply outlet to the inlet of a heat-exchanging element in thermal contact with the contents of said vessel; a return conduit, returning the cold water from the outlet of said heat-exchanging element to said return inlet, wherein said supply conduit comprises two contiguous portions, a first portion substantially exposed to the same night temperatures as is said collector, and extending between said supply outlet and a transition zone, said supply conduit taking an altogether descending course from said supply outlet socket to at least said transition zone, and a second portion having means to maintain it at night at a temperature substantially equaling that of the vessel contents and extending from said transition zone to the inlet of said heat-exchanging means inside said vessel, and wherein said return conduit comprises two contiguous portions, a first portion the inlet opening of which is connected to the outlet of said heat-exchanging means inside said vessel, which first portion is in at least indirect thermal contact with the contents of said vessel, whereby, during the night, the temperature of said first return-conduit portion is substantially equal to the temperature of said vessel contents, which first portion continues from said location in said vessel at least to the level of said transition zone of said supply conduit, from which level a second portion of said return conduit continues towards said return inlet, said second portion being substantially exposed to the same night temperatures as is said collector.

The invention also provides a solar fluid heater comprising a solar collector and a storage vessel, said solar collector having a supply outlet and a return inlet; a supply conduit, leading the heated fluid from said supply outlet to said vessel; a return conduit, returning the cold fluid from said vessel to said return inlet, wherein said supply conduit comprises two contiguous portions, a first portion substantially exposed to the same night temperature as is said collector, and extending between said supply outlet and a transition zone, said first supply-conduit portion taking an altogether descending course from said supply outlet to at least said transition zone, and a second portion having means to maintain it at night at a temperature substantially equaling that of the vessel contents and extending from said transition zone to the outlet opening of said supply conduit inside said vessel, and wherein the inlet opening, inside said vessel, of said return conduit is located at a predetermined distance below the level of said transition zone, thereby facilitating a controlled amount of reverse circulation.

The invention also provides a compact solar fluid heater comprising a substantially closed container; a thermally insulating partition subdividing the inside space of said container into a collector space and a fluid storage space; a supply conduit leading the heated fluid from said collector space into said storage space; a return conduit, returning the cold fluid from said storage space to said collector space; wherein said supply conduit comprises two contiguous portions, a first portion substantially exposed to the same night temperatures as is said collector space and extending between the upper region of said collector space and a transition zone, said first portion taking an altogether descending course from said upper collector region to at least said transition zone, and a second portion maintained at night at a temperature substantially equaling that of the contents of said storage space and extending from said transition zone to the outlet of said conduit inside said storage space, and wherein said return conduit comprises two contiguous portions, a first portion the inlet opening of which is located in said storage space, which first portion is in at least indirect contact with the contents of said storage space, whereby, during the night, the temperature of said first return-conduit portion is substantially equal to the temperature of said storage-space contents, which first portion continues from said location in said storage space at least to the level of said transition zone of said supply conduit, from which level a second portion of said return conduit continues towards said collector space, said second portion being substantially exposed to the same night temperature as is said collector space.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
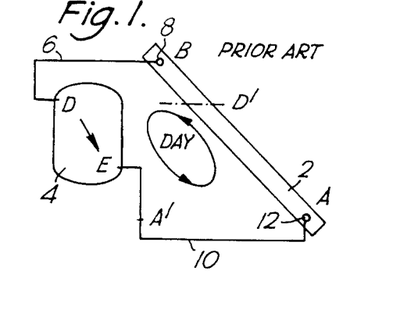
FIGS. 1 and 2 represent a basic prior art solar heater, during the day and at night, respectively.
Figure 2:
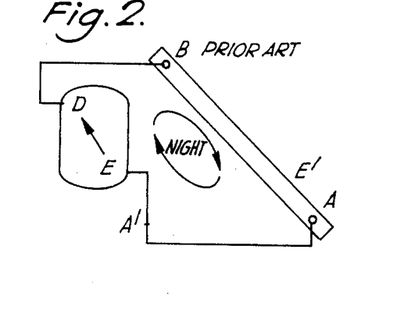

Referring now to the drawings, there is seen in FIGS. 1 and 2 a very basic, prior-art type of solar heater comprising a collector 2 and a storage tank or vessel 4. These two components are connected by a hot-water or supply conduit or pipe 6 leading from the vessel 4 to the supply socket 8, and by a cold-water or return conduit or pipe 10 leading from the vessel 4 to the return socket 12. For the sake of clarity the cold-water feeding line (from the mains) and the hot-water consumer line are not shown, except in FIG. 5, the first embodiment of the invention and in FIGS. 20, 25, 26 and 36.

With the help of these drawings, a terminology will be established and a procedure explained, whereby the thermosyphonic characteristics of solar heaters can be analyzed at least qualitatively.

While, again for the sake of clarity, the numerals which in the above served to identify the major structural elements of the heater will not be repeated in most subsequent drawings, the letters, used to define the force vectors determining thermosyphonic action will appear in all drawings.

FIG. 1 represents the above solar heater during the day. As is common knowledge, thermosyphonic action drives the water up the collector 2, down into the vessel 4 via the supply pipe 6 and back to the collector via the return pipe 10. This circulation, taking place in the counterclockwise sense, is called "forward circulation", designated as positive (+). (It should be noted that, were the collector on the left and the vessel on the right, the sense of forward circulation would be clockwise).

FIG. 2 represents the same solar heater during the night, when the water in the exposed collector has cooled down and the water in the vessel, kept hot due to the latter's insulation, pushes upwards into the supply pipe 6 and down the collector 2, now acting as a cooler, and, as cold water, flows into the vessel 4 via the return pipe 10, slowly replacing the hot water in the vessel. This type of circulation, characteristic of prior-art solar heaters, is called "reverse circulation"(−).

A water-flow accommodating portion in the flow circuit, whether a pipe, the collector or the vessel, the starting point of which portion (in direction of forward circulation) is lower than its end, is called "ascending". If its starting point is higher than its end, it is called "descending". Thus $\overline{AB}$ in FIGS. 1 and 2 is an ascending portion of the flow circuit, while BA′, is a descending portion (see also FIG. 22).

The temperatures of the water will vary from portion to portion, thereby generating gravitational circulation forces the resultant of which, if positive, will produce forward circulation and if negative-reverse circulation.

A water mass which, relative to water masses flowing in other portions, is hot, will in an ascending portion produce a force component that works for forward circulation, while the same mass of hot water in a descending portion, will produce a component working for reverse circulation.

Cold water in an ascending portion, on the other hand, will produce a component favouring reverse circulation, while the same cold water in a descending portion will produce a component favouring forward circulation.

In the following analyses a force component will be represented as force vector $+\vec{V}$, if favoring forward circulation, and as $-\vec{V}$, if favoring reverse circulation. Thus in FIG. 1, representing the situation during the day, the hot water in the ascending collector portion will produce a vector $+\vec{AB}$, favoring forward circulation, while in FIG. 2, illustrating the night conditions, the cold water in the same portion will produce a vector $-\vec{AB}$, favoring reverse circulation. The tagged letters (A',D',E') designate horizontal projections of their non-tagged originals (A,D,E). Level differences are obviously measured in the vertical direction.

Analyzing now FIG. 1, using the above notation and definitions, the situation shortly after sunrise is such as to produce a resultant force vector (day)

$$\vec{F_{RD}} = +\vec{AB} - \vec{BD} + \vec{DE} + \vec{EA}.$$

Now, as $+\vec{DE} + \vec{EA'}$ equals $+\vec{DA'}$ and $$+\vec{AB} - \vec{BD} \text{ equals } +\vec{AD'},$$

$$\vec{F_{RD}} = +\vec{DA'} + \vec{AD'} \neq 0.$$

Both terms on the right being positive, $\vec{F_{RD}}$ is obviously also positive. In other words, circulation during the day is forward circulation.

During the night (FIG. 2), when portions $\overline{AB}$ and $\overline{EA'}$ are cold and portions $\overline{ED}$ and $\overline{DB}$ are hot, the resultant force vector (night) becomes:

$$\vec{F_{RN}} = -\vec{BE'} - \vec{BE} \neq 0.$$

$F_{RN}$ is thus negative, producing reverse circulation which will cease only when $-\vec{BE}$ ceases to be negative, i.e., when the water in the vessel 4 and the supply pipe 6 are as cold as that in the collector.

Figure 3:
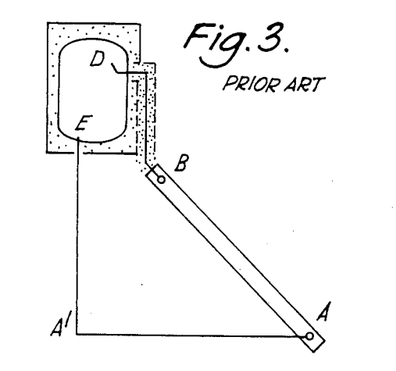
FIGS. 3 and 4 illustrate two more prior art solar heaters.

Various ways have been proposed to solve the problem of reverse circulation. The most popular of these attempts is illustrated in FIG. 3, in which the vessel is mounted above the collector, with the supply pipe extending outside of the vessel and entering the latter in its upper region, opening at D. The vertically extending portion of the supply pipe is thermally insulated. The return pipe leaves the vessel at the lower region thereof and leads to the inlet socket at the lower end of the collector.

During the day, with the onset of circulation, portions $\overline{AB}$ and $\overline{BD}$ are hot, and portions $\overline{DE}$ and $\overline{EA}$ are cold. The resultant day vector is thus $$\vec{T_{RD}} = +\vec{AB} + \vec{BD} + \vec{DE} + \vec{EA'} = \vec{AD} + \vec{DA'}$$

During the night, $\overline{DE}$ and $\overline{DB}$ are hot, and $\overline{EA}$ and $\overline{BA}$ cold. While theoretically this would result in $\vec{F_{RN}}=0$, the hitch is that because of its surface area which, relative to its volume, is very large, and in spite of its insulation, the portion $\overline{DB}$ will start losing temperature much faster than the vessel, generating a negative vector $-\vec{DB}$ which will initiate reverse circulation at a fairly rapidly increasing rate.

Figure 4:
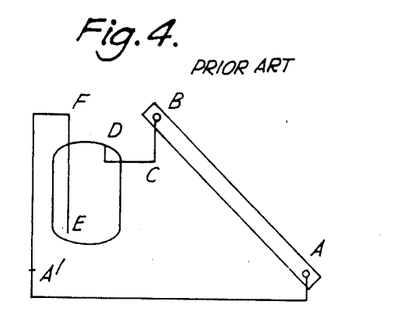

Several more attempts to solve the reverse-circulation problem are schematically represented in FIG. 4. These disclosures propose a vessel mounted besides or below the collector. The supply pipe connects to the upper part of the vessel and the return pipe opens into the lower vessel region, rises above the vessel and descends again to connect to the return socket of the collector.

At this point, the concept of "transition zone" shall be introduced, which is of importance for the analysis of the solar heaters of the present as well as the subsequent figures. The term transition zone, denoted "C" and applying only to the supply pipe, is defined as the zone in which, during the night, the water cooled down in an exposed portion of the supply pipe, encounters the hotter water in a contiguous, but insulated portion of that pipe. Wherever that zone can be more closely circumscribed, it has been marked as an interval with the letter a.

During the day, at the onset of circulation, portions $\overline{AB}$ and $\overline{BD}$ are hot, while portions $\overline{DE}$ and $\overline{EA}$ are cold. Thus $$\vec{F_{RD}} = +\vec{AB} - \vec{BC} + \vec{CD} + \vec{DE} - \vec{EF} + \vec{FA'} \neq 0$$

During the night $\overline{AB}$, $\overline{FA'A}$ and $\overline{BC}$ are cold, while $\overline{DC}$, $\overline{DE}$ and $\overline{EF}$ are hot. Therefore $$\vec{F_{RN}} = -\vec{AB} + \vec{BC} + \vec{CD} - \vec{DE} + \vec{EF} + \vec{FA'}.$$

$\overline{FA'}$ and $\overline{AB}$ being equal both as to height and temperature, it follows that $\vec{FA'} = \overline{AB}$ and $+\vec{BC} + \vec{CD} + \vec{EF} \geq \vec{DE}$. There exist therefore two possibilities: either $+\vec{BC} + \vec{CD} + \vec{EF}$, favoring forward circulation, will be equal to $\vec{DC}$, the vector favoring reverse circulation, or their sum will be larger than $\vec{DC}$. In the latter case, forward circulation will set in which, however, will be stopped almost immediately, because cold water, entering the pipe portion $\overline{EF}$ from the lower region of the vessel will at once produce a vector opposing forward circulation, bringing the entire system to a state of equilibrium, with the rest of the pipe portion up to F still hot. This equilibrium is, however, very short-lived, being of what in mechanics is known as the unstable kind, upset at the slightest provocation: the short ascending portion of the return pipe outside of the vessel (between the vessel and point F), in spite of its being insulated, will lose heat to the environment at a much faster rate than the vessel itself with its large mass of hot water. As a consequence, the water column $\overline{FE}$ becomes heavier and produces an additional, if small, vector favoring reverse circulation. As soon as this happens, cold water from the pipe portion $\overline{FA'}$ will enter portion $\overline{EF}$, further enhancing reverse circulation. Undesirable developments will also occur at the supply-pipe side, where hot water will enter portion $\overline{BC}$ and produce yet another vector favoring reverse circulation. This "snowball" effect is, of course, due to the above-mentioned unstable equilibrium inherent in the design of FIG. 4, which is particularly unsuitable for cold climates or even temperate climates with low night temperatures.

Other attempts to solve the reverse-circulation problem include the provision of a mechanical nonreturn valve permitting circulatory flow only in the forward direction. However, due to the very small hydrostatic driving forces involved in thermosyphonic circulation, these valves have to be extremely sensitive, are easily fouled by silt, mineral deposits and the like, and are therefore very unreliable.

It is of the essence of the present invention to provide a thermal nonreturn mechanism that, with the very onset of reverse circulation, will reliably suppress it.

A further term to be used in the description of the various embodiments of the invention is "balancing pipe" and refers to a pipe located alongside or inside the vessel 4 and instrumental in the prevention of reverse circulation.

Figure 5:
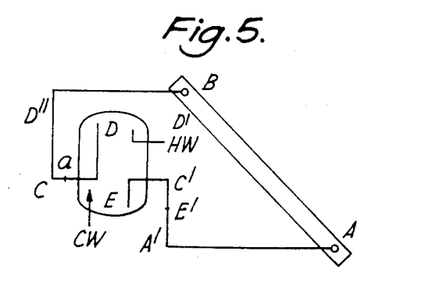
FIG. 5 is a first embodiment of the solar heater according to the invention.

FIG. 5 shows a first embodiment of the solar heater according to the invention. Although the vessel is seen to be mounted beside the collector, the arrangement is suitable for any position of the vessel relative to the collector, such as fully above, partly projecting above, beside, partly projecting below and fully below the collector.

The solar heater comprises the slanted collector, the supply pipe through which, during the day, the collector thermosyphonically supplies hot water to the vessel, and the return pipe through which, during the day, cold water returns to the collector. Seen are also the cold-water feeding line CW and the hot-water consumer line HW.

Measures are taken to ensure that, during the night, the supply pipe is thermally subdivided into two portions, a first portion which is subjected to about the same night temperature as is the collector, and a second portion maintained at a temperature substantially equal to that of the water in the vessel. Such measures may include fully exposing, or only partly and slightly insulating the first portion, or accommodate that portion at least partly in the collector housing, and fully and thoroughly insulating the second portion, or at least partly accommodating it inside the vessel.

These two, contiguous, pipe portions meet at the hereinbefore defined transition zone C. Tagged letters, it will also be remembered, are horizontal projections of their non-tagged originals.

The supply pipe descends from the upper collector point B to the transition zone C, whence it continues into the vessel, opening thereinto at D.

The return pipe starts inside the vessel at point E and ascends at least to the height of C', i.e., the projection of the transition zone C of the supply pipe. From C' the return pipe continues to the lower collector point A.

During the day, after circulation has set in, portions $\overline{AB}$, $\overline{BC}$ and $\overline{CD}$ will be hot, while portions $\overline{DE}$, $\overline{EC'}$ and $\overline{C'A'}$ will be cold.

During the day the circulation force resultant will be $$\vec{F_{RD}} = +\vec{AB} - \vec{BC} + \vec{CD} + \vec{DE} - \vec{EC} + \vec{CA'},$$

which reduces to the forward circulation force during the day of $$\vec{F_{RD}} = +\vec{AD'} + \vec{DA'},$$

since $+\vec{CD}$ and $-\vec{CD''}$ are equal in magnitude but of opposing signs, and so are the pairs $+\vec{BD'}$ and $-\vec{BD''}$, and $+\vec{C'E'}$ and $-\vec{C'E}$.

During the night, the cold portions are $\overline{AB}$, $\overline{BC}$ and $\overline{C'A}$, and the hot portions $\overline{CD}$, $\overline{DE}$ and $\overline{EC'}$. The circulation force resultant will be $$\vec{F_{RN}} = -\vec{AB} + \vec{BC} + \vec{CD} - \vec{DE} + \vec{EC'} + \vec{CA'} = 0,$$

since $-\overline{AB}$ and $(+\overline{BC} + \overline{C'A'})$ are equal in magnitude, but of opposing signs, and so is the pair $(+\overline{CD} + \overline{EC'})$ and $\overline{DE}$.

Figure 6:
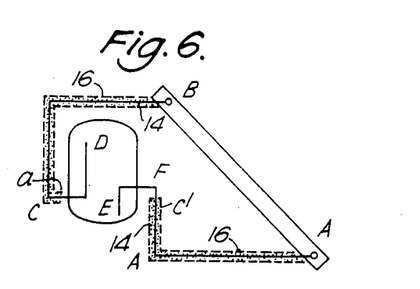
FIG. 6 shows a variant of the embodiment of FIG. 5.

In the embodiment of FIG. 6 the return pipe ascends to a point F somewhat above the transition zone C, thereby enhancing the thermal mechanism preventing reverse circulation. Further seen is a partial insulation 14 surrounding, circumferencially, half the surface area of both the supply and the return pipe. The other half is covered with a thin, transparent plastic sheath 16. In this way heat losses during the day are largely prevented, while during the night the thin plastic sheath 16 will not interfere with the required exposure, to night temperature, of the cold portions of the supply and return pipes. The above partial insulation covers the supply pipe portion BC and the return pipe portion C'A'. The remaining short pipe portions as well as the vessel itself are well insulated with, e.g., polyurethane. This type of selective insulation is also applicable to other embodiments of the invention.

Figure 7:
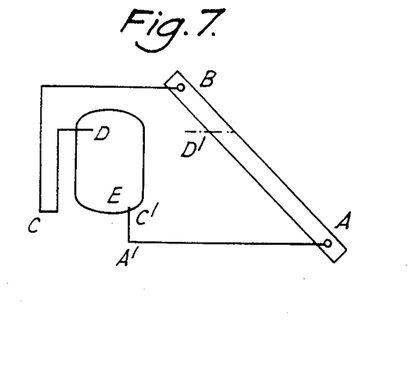
FIG. 7 illustrates an embodiment in which the hot portion of the return pipe is reduced to zero length.

FIG. 7 illustrates a different embodiment of the invention. The transitional zone C is designated to be located at the same height as the bottom of the vessel. Therefore, the hot portion $\overline{EC'}$ of the return pipe is reduced to zero and what remains of the return pipe is only the cold portion $\overline{C'A'}$.

In the morning, when the collector begins to warm up, it will take somewhat longer until a forward circulation vector has developed that is strong enough to force the hot water down beyond the lowest point of the supply pipe. But once that point has been passed, portion $\overline{CD}$ heats up quickly and assists in establishing forward circulation.

At that instant, the hot portions are $\overline{AB}$, $\overline{BC}$ and $\overline{CD}$, with the cold portions being $\overline{DE}$ ($\overline{EC'}=0$) and $\overline{C'A'}$. As was the case with the embodiment of FIG. 5, the resultant force during the day will reduce to $\vec{F_{RD}} = +\vec{AD'} + \vec{DA'}$.

During the night, because of the above-mentioned reduction to zero of $\overline{EC'}$, the only hot pipe portion will be the portion $\overline{CD}$. Also hot during the night is obviously the vessel portion $\overline{DE}$. All other portions are cold, and the resultant $\vec{F_{RN}}$ equals zero.

In this embodiment, the balancing pipes are constituted only by the supply pipe (portion $\overline{BC}$ balances the collector, portion $\overline{CD}$, the entire vessel), while in the prior-art solar heater shown in FIG. 4, the balancing pipe is constituted by the return pipe. As explained earlier, the solution offered by the above prior-art heater is unstable, inasmuch as even a weak vector favoring reverse circulation will immediately "snowball" and cause an irreversible breakdown of the precarious initial equilibrium.

In contradistinction to the above, the thermal nonreturn mechanism of the present invention, in which the balancing member is formed by the supply pipe, is stable, as will be shown presently.

Assuming in the embodiment of FIG. 7 the vessel, at night, to be hot, but the pipe portion $\overline{CD}$ (which is supposed to be hot, too, in order to produce a vector opposing reverse circulation) to have cooled down for some reason. As a result, $$\vec{F_{RN}} = -\vec{AB} + \vec{BC} - \vec{CD'} - \vec{CD} + \vec{CA'} = -\vec{DE} - \vec{DC},$$

in other words, reverse circulation sets in and hot water from the hot part of the vessel will flow into portion $\overline{CD}$. However, as soon as this hot water reaches the transition zone C, reverse circulation will at once stop, before hot water has reached the collector, because now $\overline{CD}$ and $\overline{DE}$, while of the same magnitude, are of opposing signs (because, as will be remembered, hot water in an ascending pipe portion ($\overline{CD}$) will favor forward circulation and has therefore a positive sign, while hot water in a descending portion ($\overline{DE}$) will favour reverse circulation and has thus a negative sign).

The solar heater according to the invention is thus seen to be self-correcting, reestablishing equilibrium that has been upset for whatever reason.

Figure 8:
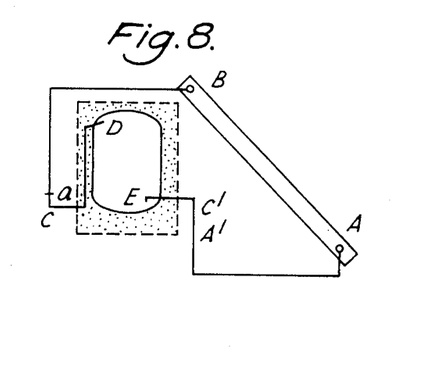
FIGS. 8 and 9 show different ways of preventing the hot portion of the supply pipe from cooling down.
Figure 9:
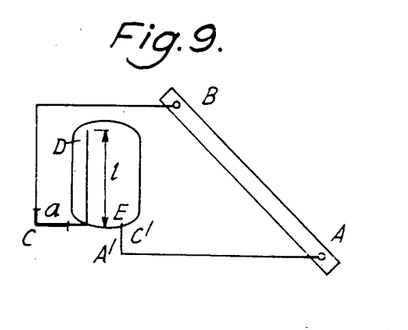

Still, every measure should be taken to prevent $\overline{CD}$ from cooling down. This can be done properly insulating the portion $\overline{CD}$ or by mounting the bulk of portion CD in thermal contact with the vessel and embedding it in the vessel's insulation (except for the end D, which of course, must open into the vessel), as shown in FIG. 8. Another method of maintaining the portion $\overline{CD}$ in the hot state is illustrated in FIG. 9, where the upright limb of portion $\overline{CD}$ is located inside the vessel, thus precluding heat losses in that portion.

Figure 10:
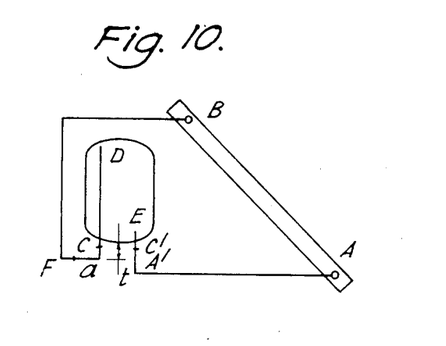
FIG. 10 shows an embodiment with a supply pipe descending below the transition zone.

In the embodiment of FIG. 10, the supply pipe continues downwards beyond the transition zone C. The overlap t produced by this extension enhances the thermal nonreturn mechanism.

Figure 11:
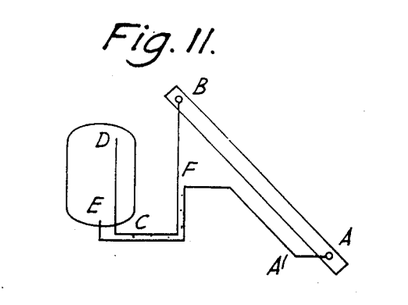
FIG. 11 represents an embodiment with an intimate thermal contact between portions of the supply pipe and the return pipe.

In FIG. 11 there can be seen an intimate thermal contact between portions of the supply pipe and of the return pipe. The importance of such thermal contact will be elucidated further below.

Figure 12:
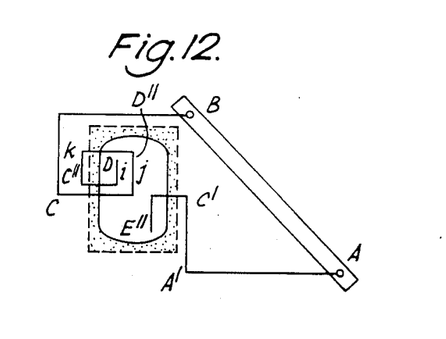
FIGS. 12 and 13 illustrate embodiments with a "coiled up" supply pipe and return pipe, respectively.
Figure 13:
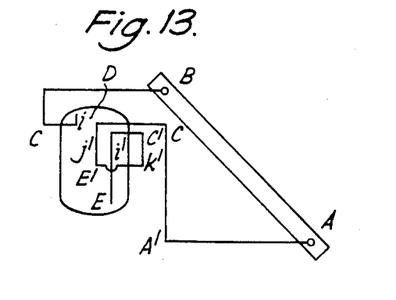
Figure 22:
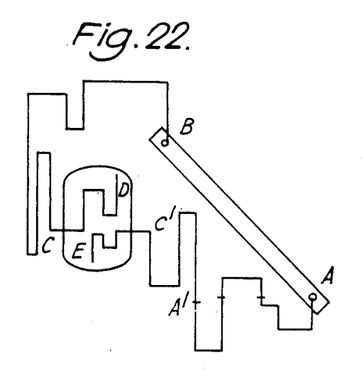
FIG. 22 illustrates the meaning of the terms "ascending" and "descending"

The embodiments illustrated in FIGS. 12 and 13 show another way of reinforcing the thermal nonreturn mechanism by increasing the effective length of the balancing pipe $\overline{CD}$. Accordingly, (FIG. 12), the supply pipe is "coiled up", producing two vertical portions i and j inside the vessel and their outside counterparts k and BC. It is, of course, possible to produce more than two "turns" as shown in FIG. 12. It should be stressed that for this arrangement to be effective, each inside portion (e.g., i,j) must have its counterpart (e.g., k,BC) on the outside. Pipes which merely meander inside the vessel, with water temperatures in the meandering limbs identical (such as shown in FIG. 22) are quite useless for the purpose of reinforcing the nonreturn effect.

In FIG. 13, the "coil-up" is carried out on the return pipe, and has the same effect. It is, of course, possible to "coil up" both the supply and return pipe portions.

Figure 14:
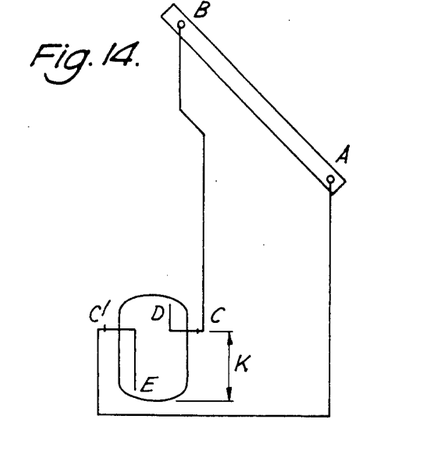
FIGS. 14, 15 and 16 exemplify the mounting of the vessel relative to the collector in three different positions, respectively.
Figure 15:
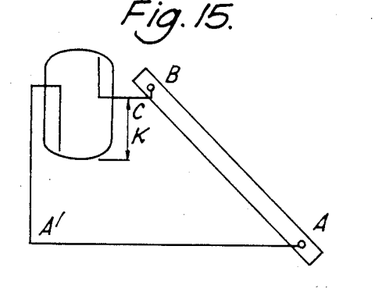
Figure 16:
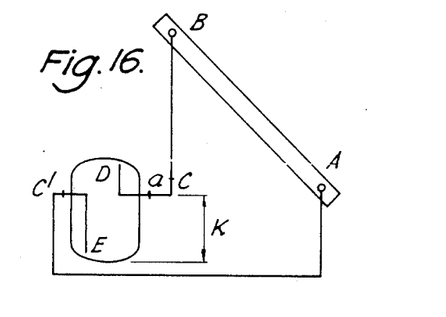

FIGS. 14, 15 and 16 exemplify the mounting of the vessel relative to the collector in three different positions: Entirely below the collector (FIG. 14), partly projecting above the collector (FIG. 15) and partly projecting below the collector (FIG. 16). The vessel is of the type shown in FIG. 5 and the distance between the vessel bottom and the level of the transition zone C is denoted k.

Figure 17:
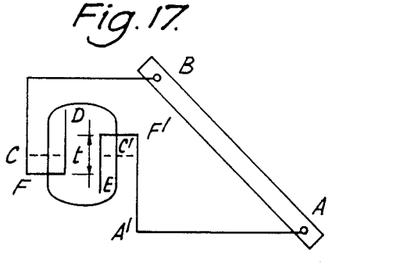
FIG. 17 shows a way of reinforcing the thermal non-return mechanism.

FIG. 17 illustrates a design in which the thermal nonreturn mechanism is doubly reinforced, both on the supply and the return side, by an overlap t produced by firstly extending the original supply pipe portion $\overline{BCD}$ downwards below the level of C, thus increasing the balancing portion $\overline{DC}$ to $\overline{DF}$, and, secondly, extending the original return pipe portion $\overline{EC'A'A}$ upwards beyond the level of C', thus increasing the balancing portion $\overline{EC'}$ to $\overline{EF'}$.

In climates and locations where night temperatures are likely to drop below zero and, by causing the water in the collector to freeze, are liable to endanger its integrity, a controlled amount of reverse circulation may be necessary to prevent such freezing.

Figure 18:
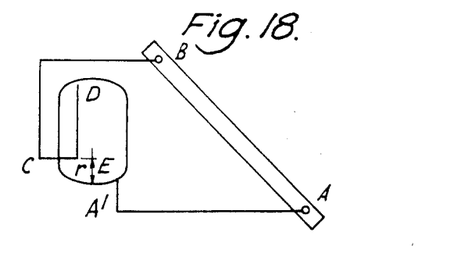
FIG. 18 illustrates a method of introducing a controlled amount of reverse circulation.

FIG. 18 describes a way of producing such a result, namely, by not bringing the return pipe up to the level of the transition zone C, i.e., by eliminating the portion EC' in the embodiment of FIG. 5. The rate of return circulation is determined by the distance r between E and C.

Figure 19:
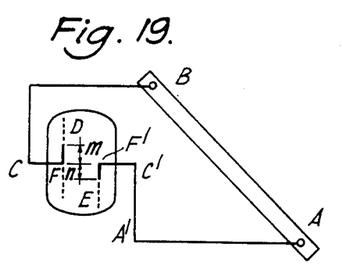
FIG. 19 demonstrates the variability of the location of the supply pipe outlet and the return pipe inlet.

FIG. 19 demonstrates the fact that the location, in the vessel, of the supply pipe outlet D and of the return pipe inlet E is of no importance. D could even be located below E. In the drawing, D is located at a distance m above F, and E is positioned at a distance n below F'.

Figure 20:
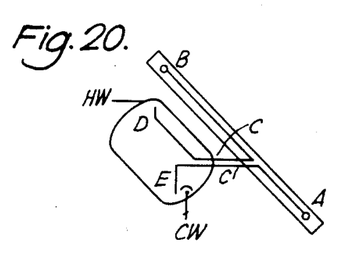
FIG. 20 presents a way of keeping the cold portions of the supply and return pipes at the collector temperature at night.

FIG. 20 represents a way of ensuring one of the basic conditions of the invention, according to which, during the night, the cold portions of both the supply pipe and the return pipe must be exposed to the same temperatures as is the collector. This condition is met by accommodating both the supply pipe portion $\overline{BC}$ and the return pipe portion $\overline{AC}$ inside the collector housing, where they are obviously exposed to the temperatures affecting the collector.

Figure 21:
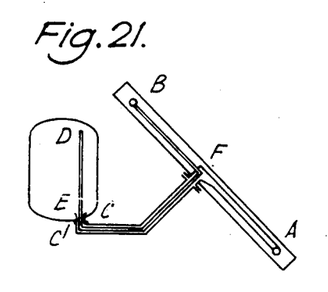
FIG. 21 illustrates an embodiment that combines some features of the embodiments of FIGS. 11 and 20.

In FIG. 21 there is seen an embodiment which combines the features of the embodiments of FIGS. 11 and 20, namely, the thermal proximity of certain pipe sections, and the exposure of other pipe sections to collector night temperatures.

It is seen that while the supply pipe portion $\overline{BF}$ is accommodated in the collector housing, portion $\overline{FC}$ is accommodated in a larger-diameter pipe $\overline{FE}$, which constitutes the continuation of the return pipe portion $\overline{AF}$ that is equally accommodated in the collector housing. From a practical point of view, this embodiment is very attractice, as in the field, that is on the roof, two double joints (at F and E) are less troublesome to connect than four separate joints.

The somewhat modernist embodiment of FIG. 22 was already referred to in conjunction with FIGS. 12 and 13, and is mainly intended to demonstrate the meaning of "altogether ascending" and "altogether descending" B, the starting point (in direction of forward circulation) of the first portion of the supply pipe $\overline{BC}$ being located at a higher point than its end C, portion $\overline{BC}$ is an altogether descending portion of the circulatory circuit, and so is the return pipe portion $\overline{C'A}$, in spite of their initial ascents and subsequent meanderings. The hot balancing portion CD on the other hand would have the overall effect of an ascending pipe, the meanderings in the various portions having no effect on the overall balance of force vectors.

Figure 23:
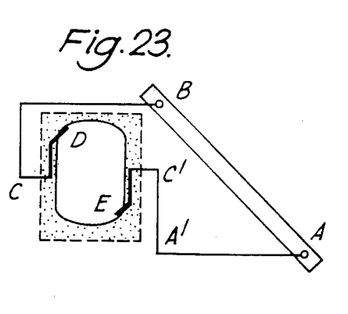
FIGS. 23 and 24 are two examples of different locations of the balancing pipe portions.

The embodiment of FIG. 23 shows the two balancing portions $\overline{CD}$ and $\overline{EC'}$ located outside of, but in at least indirect contact with, the vessel, except, of course, for their ends which enter the vessel.

Figure 24:
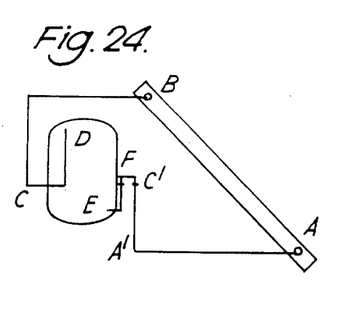

FIG. 24 shows one of the balancing pipes inside the vessel, in this particular case, the balancing portion $\overline{CD}$ of the supply pipe, and the other, being the balancing portion $\overline{EF}$ of the return pipe, outside of the vessel.

Figure 25:
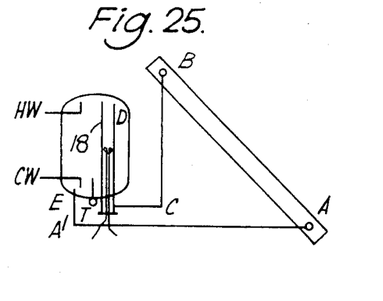
FIGS. 25 and 26 show two embodiments in which the hot-water portion of the supply pipe is an internally heatable sleeve.

In the embodiment of FIG. 25, the hot portion $\overline{CD}$ of the supply pipe is in the form of a sleeve 18 which accommodates an auxiliary heating element (working either on electricity or gas) serving as back-up heater. Heating produced by this element will be of the layered type. The water heated by the heating element will exit the sleeve 18 at the top and cold water will flow into the collector through the thermosyphonic circuit via $\overline{DEA'A}$ and back to the supply pipe via $\overline{BC}$, that is, through forward circulation. A thermostat T mounted in the lower region of the vessel will stop the heating action of the element as soon as it senses the presence of hot water in its vicinity. One or two additional thermostats (one located near the top of the vessel, the other at about midheight) facilitate economies in energy consumption by providing better layer control.

Beyond the aforementioned advantages, the heating of the portion $\overline{CD}$ of the supply pipe also constitutes a powerful tool in the prevention of reverse circulation.

Figure 26:
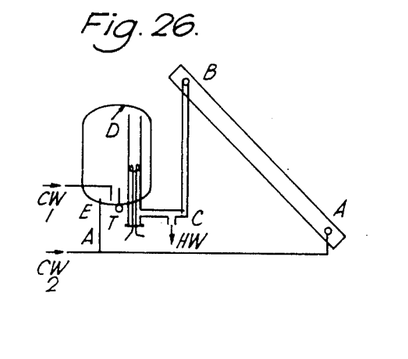

The embodiment of FIG. 26 is basically the same as that of FIG. 25, except that the hot-water (HW) consumer connection is located at about the transition zone C and there are two alternative connections for the cold-water feeding line: either from the side, as in FIG. 25 (CW1) or straight into the return pipe at A' (CW2). Hot water is drawn from the supply-pipe portion CD.

Figure 27:
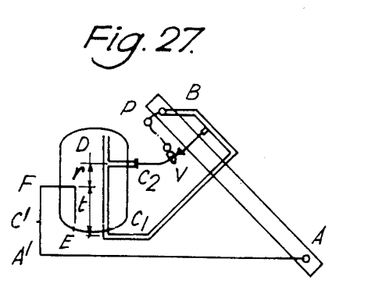
FIG. 27 illustrates an embodiment with two alternative thermosyphonic circulations.

The embodiment illustrated in FIG. 27 is intended for use in locations where temperatures are known to drop, from time to time, below zero. What is seen is a thermosyphonic circuit $\overline{BC_1DEFA}$ similar to those found in other embodiments, with the distance t between F and $C_1$ effectively preventing reverse circulation. This circuit is operative under above-zero conditions. At point $C_2$ a horizontal pipe portion branches off, which serves as a higher-level supply pipe $\overline{BC_2D}$ and is located at a distance r above point F of the return pipe. In cold weather, when temperatures approach 0° C., a thermostatic valve V, controlled by a sensor P sensing the collector temperature, opens the branch $DC_2$ for reverse circulation from vessel to collector. As soon as hot water from the vessel reaches the collector, sensor P closes the valve V and reverse circulation will resume only when collector temperature again drops to dangerous levels.

Figure 28:
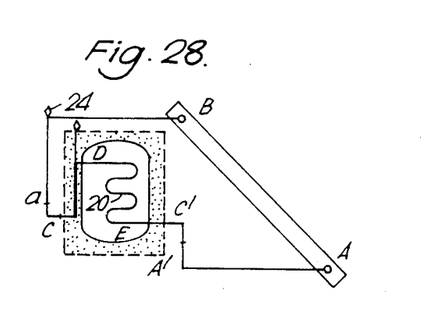
FIGS. 28, 29, 30, 31, 32 and 33 represent embodiments in which there is separation between the thermosyphonic liquid and the consumer liquid.
Figure 29:
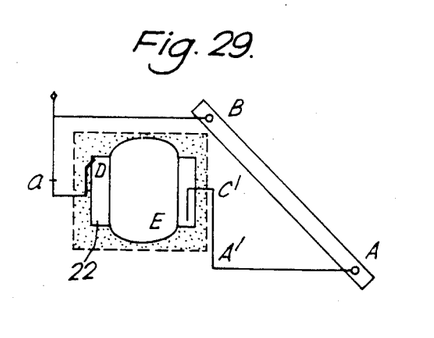
Figure 30:
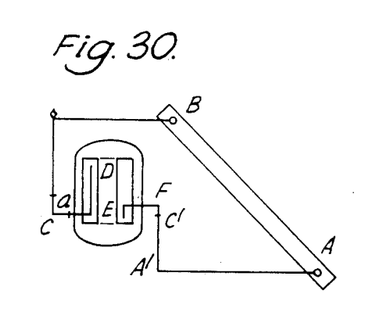
Figure 31:
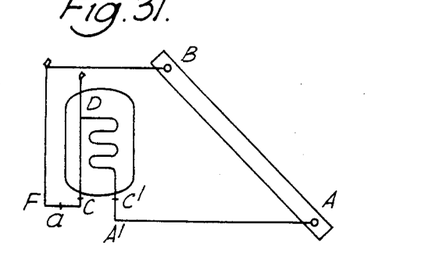
Figure 32:
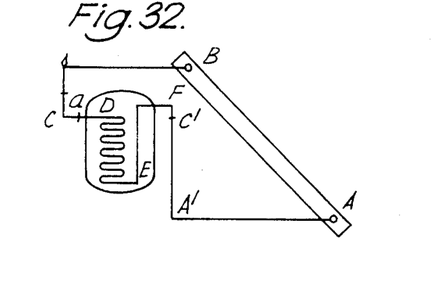

FIGS. 28, 29, 30, 31, 32 and 33 represent embodiments in which there is complete separation between the heating liquid which fills the thermosyphonic circuit, and the consumer liquid. In these embodiments, the vessel is in the nature of a heat exchanger, the consumer liquid inside the vessel constituting the "sink" and the thermosyphonic liquid inside its confines constituting the "source". In FIGS. 28, 31 and 32 these "confines" are in the form of a coiled or meandering tube 20, the distance between the ends of which is, thermodynamically, the equivalent of the distance $\overline{DE}$ in the vessels of the previous embodiments. The supply pipe $\overline{BCD}$ from the collector enters the coil at D, with the return pipe $\overline{EC'A'A}$ leaving it at E. The hot supply pipe portion $\overline{CD}$ can either be located outside of the vessel as in FIG. 28, or inside the vessel as in FIG. 31.

Figure 33:
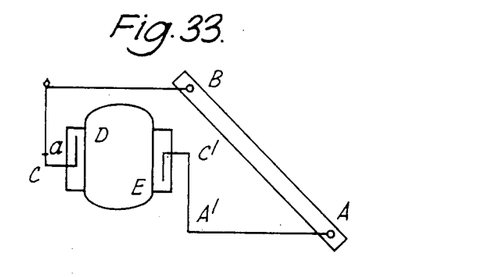

In FIGS. 29, 30 and 33 the above "confines" are in the form of an annular container 22 which is either in the form of an external jacket as in FIGS. 29 and 33, or is located inside the vessel as in FIG. 30. Also seen are air valves 24 mounted at the highest points of the systems, which automatically release air trapped at these points, without permitting the liquid to escape. Such valves are understood to be provided in all embodiments of the invention, even if not specifically mentioned.

Figure 34:
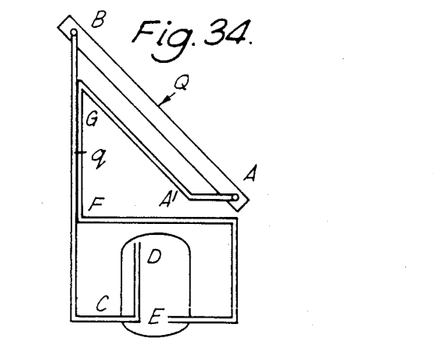
FIG. 34 illustrates an embodiment in which the vessel is mounted below the collector.

A solar heater in which the vessel is mounted below the collector is shown in FIG. 34. At first sight, it would appear that, the vessel being fully below the collector, such an arrangement could not work by thermosyphonic circulation. Closer observation, however, reveals the "trick" which persuades the hot water from the collector to flow in the downward direction: A heat sink q is provided in the form of a return-pipe portion $\overline{FG}$ which is arranged to be in thermal conduct with a portion of the supply pipe $\overline{BCD}$, which thus cools down sufficiently to provide a vector of adequate magnitude to drive the cooler water from the vessel up into the collector. While due to the intentional cooling at portion q of the water in the vessel will be of a temperature lower than the output temperature of the collector at B, modern collectors, in which water temperatures can approach, and exceed, 100° C. will still produce consumer water temperatures competing with those yielded by conventional collectors.

It is of course also possible to effect the required cooling-down of the supply pipe BCD by providing an external heat exchanger in which the "hot" member is constituted by a portion of the supply pipe.

Figure 35:
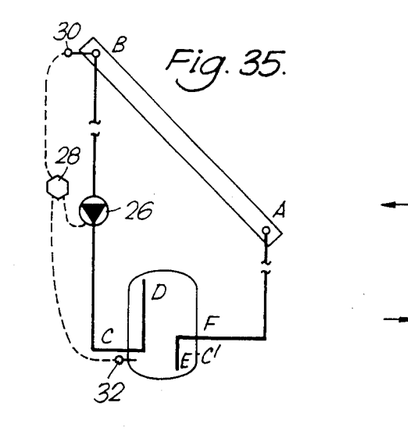
FIG. 35 represents a forced-circulation solar heater incorporating the thermal non-return mechanism according to the invention.

FIG. 35 represents a forced-circulation solar heater incorporating the thermal nonreturn mechanism of the invention. The circulation pump 26 is controlled by a differential thermostat 28 having two sensors, an upper sensor 30 located at the collector outlet and a lower sensor 32 located in the lower region of the vessel. The thermostat 28 will switch on the pump 26 only when the sensors report a predetermined temperature difference between the water in the collector and that at the lower vessel region where the inlet E of the return pipe is located. Nonreturn during the night is the result of the relationships: $\vec{ED} = +\vec{CD} + \vec{EF}$; $\vec{BC} = +\vec{AB} + \vec{AF}$.

This arrangement is suitable for solar heaters with large differences in height of location between collector and vessel and is obviously also suitable for indirect heating of the consumer water such as exemplified in FIGS. 28 to 33.

Figure 36:
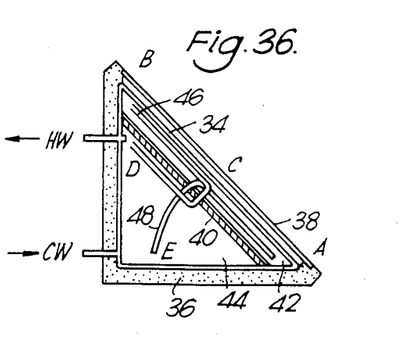
FIG. 36 is a schematic, cross-sectional view of a compact solar heater based on the thermal non-return mechanism according to the invention.

A compact, integral collector/vessel design based on the thermal nonreturn mechanism of the invention is schematically represented in FIG. 36.

The device consists of a pressure-proof container in the form of a hollow, triangular prism, one surface of which is provided with a per-se known radiation-absorbing coating and serves as collector surface 34. The other two surfaces (as well as the unseen lateral surfaces) are embedded in a thermally insulating layer 36, while the collector surface is provided with glazing 38.

The prismatic inside space of the container is subdivided by an insulative partition 40 into two separate spaces, a collector space 42 and a storage space 44. A supply pipe 46 connecting the collector space 42 with the storage space 44, begins at B in the upper part of the collector space 42, descends inside this space as far as the transition zone at point C, tranverses the partition at that point and ascends inside the storage space 44 up to point D. The return pipe 48 begins at E in the lower region of the storage space 44, ascends and crosses into the collector space 42 at C, and descends as far as point A.

The above-described compact collector can also be entirely made of non-rigid plastics, assuming a stable shape when water-filled.

As the transition zone C is locatable wherever desired, it can also be moved to the lower region (still starting at B and ending at D), the supply pipe 46, being now longer, crossing the partition 40 at the lower edge thereof. In this case, the return pipe can be dispenses with by providing a hole or notch through or across the lower edge of the partition 40.

Figure 37:
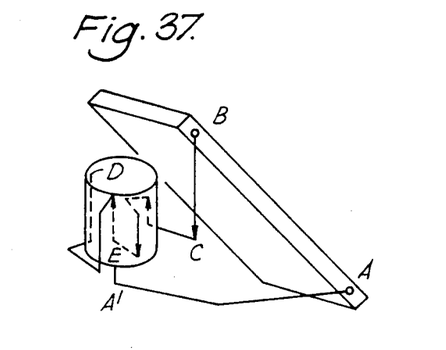
FIG. 37 represents a variant of the embodiment of FIG. 12.

A variant of the embodiment represented in FIG. 12 is shown in FIG. 37, in which the supply pipe is seen to take a meandering course into, and out of, the vessel, with the supply-pipe portions inside the vessel shown in dashed lines.

The inside, ascending, portions can be considered at night as subdivisions of the "hot" supply-pipe portion, while the outside, descending, portions are seen, at night, as subdivisions of the "cold" supply-pipe portion.

For full equilibrium during the night, the sum of the lengths of the ascending portions of the supply pipe should equal the vertical distance between the supply-pipe outlet D and the return-pipe inlet E, while the sum of the lengths of the descending portions of the supply pipe should equal the vertical distance AB of the collector. Reducing the total length of the descending supply-pipe portions will introduce a controllable reverse circulation, while increasing the total length of the ascending portions gives added protection against reverse circulation.

A similar arrangement can also be made with the return pipe (in analogy with FIG. 13), or with both the supply and the return pipe.

Figure 38:
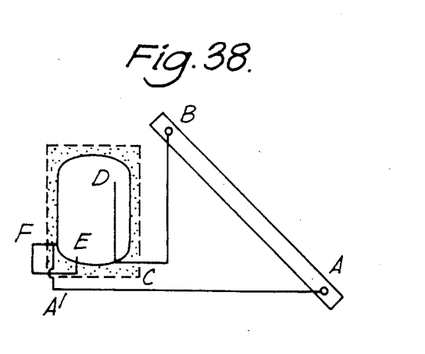
FIG. 38 illustrates a variant of the embodiment of FIG. 13.

FIG. 38 represents a variant of the embodiment of FIG. 13, in which a portion of the return pipe is "coiled up". As distinct from FIG. 13, however, the "hot" half-turn of the return pipe is not located inside the vessel, but on the outside thereof, in thermal contact with the latter, and embedded in the thermal insulation surrounding the vessel.

Figure 39:
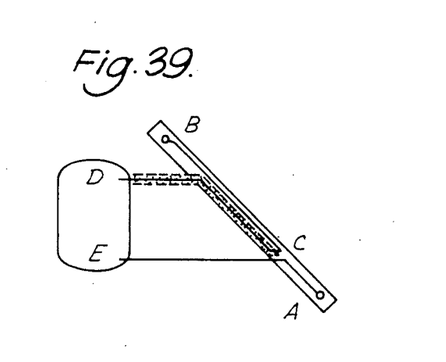
FIG. 39 shows a development of the embodiments presented in FIGS. 20 and 21.

A further development of the embodiments of FIGS. 20 and 21, in which portions of the supply and return pipe are accommodated in the collector housing, is shown in FIG. 39. Here, not only the cold portions of both the supply and return pipes, BC and AC, respectively, are located inside the collector housing, but also part of the supply-pipe portion CD. To meet the equilibrium condition according to which supply-pipe portion CD must be maintained hot also during the night, the entire length CD is thermally insulated.

While throughout the specification the term "water" was used for the working as well as for the consumer fluid, it should be understood that the solar heater according to the invention is also suitable for fluids other than water.

It should also be noted that the term "collector" as used in this specification is meant to cover also non-solar heat sources such as heating furnaces, heat pumps, and the like.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A fluid solar heater, comprising:
    a solar collector and a storage vessel, said solar collector having a supply outlet and a return inlet;
    a supply conduit, leading heated fluid from said supply outlet to said vessel and having an outlet opening located inside said vessel;
    a return conduit, returning cold fluid from said vessel to said return inlet and having an inlet opening located inside said vessel;
    said supply conduit comprising two contiguous portions, a first portion of said two contiguous portions being substantially exposed to the same night temperature as is said collector, and extending between said supply outlet and a transition zone, said first supply conduit portion taking an altogether descending course from said supply outlet to at least said transition zone, and a second portion having means to maintain it at night at a temperature substantially equalling that of the vessel contents and ascending from said transition zone to the outlet opening of said supply conduit inside said vessel; and
    said return conduit comprising two contiguous portions, a first of said last-mentioned two contiguous portions having an inlet opening located in said vessel; said last-mentioned first portion being in at least indirect thermal contact with the contents of said vessel, whereby, during the night, the temperature of said first return-conduit portion is substantially equal to the temperature of said vessel contents, which first portion continues from said inlet opening inside said vessel at least to the level of said transition zone of said supply conduit, from which level a second portion of said return conduit continues towards said return inlet, said second portion being substantially exposed to the same night temperature as is said collector.

2. The solar heater as claimed in claim 1, wherein said means is a thermal insulation in which is embedded at least part of said second portion of said supply conduit.

3. The solar heater as claimed in claim 1, wherein said first portion of said supply conduit and said second portion of said return conduit are partly thermally insulated.

4. The solar heater as claimed in claim 1, wherein said first portion of said supply conduit and second portion of said return conduit are accommodated in the housing of said collector.

5. The solar heater as claimed in claim 4, wherein part of said first portion of said supply conduit is accommodated inside a larger-diameter pipe leading from said collector to said vessel, said larger-diameter pipe being part of said second portion of said return conduit.

6. The solar heater as claimed in claim 4, wherein, furthermore, at least a part of said second portion of said supply conduit is accommodated in said collector housing, said second portion being thermally insulated along its entire length.

7. The solar heater as claimed in claim 1, wherein at least part of said first portion of said supply conduit and of said second portion of said return conduit are in at least indirect thermal contact.

8. The solar heater as claimed in claim 1, wherein said second portion of said supply conduit is in the form of a sleeve accommodating means for heating the fluid passing therethrough.

9. The solar heater as claimed in claim 1, further comprising a length of pipe adapted to short-circuit parts first and said second portion of said supply conduit.

10. The solar heater as claimed in claim 1, further comprising a circulation pump controlled by differential thermostat, a first sensor located near the outlet of said collector and a second sensor located in the lower region of said vessel, whereby said thermostat will switch on said pump only when said sensors signal a predetermined temperature difference between the fluid in said collector and that in said lower region.

11. The solar heater as claimed in claim 1, wherein said second portion of said supply conduit is coiled up and mounted in such a way that one half-turn of each turn of said coiled-up conduit comes to be located inside of said vessel and the other half turn of each of said turns comes to be located outside of said vessel.

12. The solar heater as claimed in claim 1, wherein said first portion of said return conduit is coiled up and mounted in such a way that one half-turn of each turn of said coiled-up conduit comes to be located inside of said vessel and the other half turn of each of said turns comes to be located outside of said vessel.

13. The solar heater as claimed im claim 1, wherein said heat-exchanger means in annular container surrounding, or located inside of, said vessel.

14. A solar fluid heater, comprising:
a solar collector and a storage vessel, said solar collector having a supply outlet and a return inlet;
a supply conduit, leading heated fluid from said supply outlet to a heat-exchanging element in thermal contact with contents of said vessel, said heat-exchanging element having an inlet and an outlet;
a return conduit, returning cold water from the outlet of said heat-exchanging element to said return inlet;
said supply conduit comprising two contiguous portions, a first portion of said two contiguous portions being substantially exposed to the same night temperatures as is said collector, and extending between said suppply outlet and a transition zone, said first supply conduit taking an altogether descending course from said supply outlet to at least transition zone, and a second portion of said two contiguous portions having means to maintain it at night at a temperature substantially equalling that of the vessel contents and ascending from said transition zone to the inlet of said heat-exchanging element; and
said return conduit comprising two contiguous portions, a first portion of said two contiguous portions having an inlet opening connected to the outlet of said heat-exchanging element, said last-mentioned first portion being in at least indirect thermal contact with the contents of said vessel, whereby, during the night, the temperature of said first return-conduit portion is substantially equal to the temperature of said vessel contents, which first portion continues from said inlet opening at least to the level of said transition zone of said supply conduit, from which level a second portion of said return conduit continues towards said return inlet, said second portion of said return conduit being substantially exposed to the same night temperatures as is said collector.

15. The solar heater as claimed in claim 14, wherein said heat-exchanger means is a coiled or meandering pipe.

16. A solar fluid heater, comprising:
a solar collector and a storage vessel, said solar collector having a supply outlet and a return inlet;
a supply conduit, leading the heated fluid from said supply outlet to said vessel and having an outlet opening located inside said vessel;
a return conduit, returning cold fluid from said vessel to said return inlet and having an inlet opening located inside said vessel;
said supply conduit comprising two contiguous portions, a first portion of said contiguous portions being substantially exposed to the same night temperature as is said collector, and extending between said supply outlet and a transition zone, said first supply-conduit portion taking an altogether descending course from said supply outlet to at least said transition zone, and a second portion of said two contiguous portions having means to maintain it at night at a temperature substantially equalling that of the vessel contents and ascending from said transition zone to the outlet opening of said supply conduit inside said vessel; and
the inlet opening, inside said vessel, of said return conduit being located at a predetermined distance below the level of said transition zone, thereby facilitating a controlled amount of reverse circulation.

17. A compact solar fluid heater, comprising:
a substantially closed container;
a thermally insulating partition subdividing the inside space of said container into a collector space and a fluid storage space;
a supply conduit leading the heated fluid from said collector space into said storage space and having an outlet located inside said storage space,
said supply portion comprising first and second contiguous portions, said first contiguous portion being substantially exposed to the same night temperatures as is said collector space and extending between the upper region of said collector space and a transition zone, said first contiguous portion taking an altogether descending course from said upper collector region to at least said transition zone, and said second contiguous portion being maintained at night at a temperature substantially equalling that of the contents of said storage space and ascending from said transition zone to the outlet of said conduit inside said storage space; and
said return conduit comprising two contiguous portions, a first portion of said two contiguous portions having an inlet opening located in said storage space, said last-mentioned first portion being in at least indirect contact with the contents of said storage space, whereby, during the night, the temperature of said first-return conduit portion is substantially equal to the temperature of said storage-space contents, which first portion continues from said inlet opening inside said storage space at least to the level of said transition zone of said supply conduit, from which level a second portion of said return conduit continues towards said collector space, said last-mentioned second portion being substantially exposed to the same night temperature as is said collector space.

18. The compact solar heater as claimed in claim 17, wherein said transition zone is located at about the midline of said partition and said return conduit is a length of pipe having its one open end in the lower region of said storage space and its other end in the lower region of said collector space.

19. The compact solar heater as claimed in claim 17, wherein said transition zone is located at about the lower edge of said partition and said return conduit is in the form of a bore in, or a notch across, said partition close to, or at, said lower edge, one end of said bore or notch opening into said collector space and the other end of said bore or notch opening into said collector space.

* * * * *